Patented May 8, 1951

2,551,760

UNITED STATES PATENT OFFICE 2,551,760

HIGH STYRENE-BUTADIENE COPOLYMER AND PROCESS OF MAKING SAME

Lloyd H. Perry, Stoughton, Mass., assignor to Union Bay State Chemical Co., Inc., Cambridge, Mass., a corporation of Massachusetts No Drawing. Application November 27, 1948, Serial No. 62,425

6 Claims. (Cl. 260—83.7)

This invention relates to the manufacture of a new and unique type of hydrocarbon resin.

Hydrocarbon resins produced in accordance with prior art practices have not been entirely satisfactory because they have suffered from the disadvantages on the one hand of having such low molecular weights as to be insufficiently hard for most uses, or on the other extreme of having molecular weights so high that the resins are brittle, insoluble and difficult to use. For example, polymers derived from terpenes are either soft or so nearly crystalline that they lack adhesion and flexibility. Polymers of styrene and other vinyl compounds are generally hard and insoluble in aliphatic hydrocarbons.

The general practice in bulk polymerizations is to use extremely reactive catalysts such as metal halides. The result is a rapid polymerization that tends to be disorderly and causes cross linking. Also since these polymerizations are strongly exothermic, there is a considerable problem involved in dissipating heat and maintaining a uniform polymer during a given run or from batch to batch. Attempts to moderate such polymerizations by operating at reduced temperatures involve costly equipment and procedures.

The principal objects of the present invention are to produce a hydrocarbon resin which is substantially crystal-clear and water-white, non-toxic, stable and solid, which is soluble in naphtha and the like aliphatic solvents and which will produce a strong, tough, flexible film without the necessity of using plasticizers; to produce a resin which is resistant to water, alkalies and acids, and which can be cured or vulcanized in accordance with usual procedures; and to provide an efficient and reliable process of producing such a resin.

Further objects will be apparent from a consideration of the following disclosure.

In accordance with the present invention, hydrocarbon resins are produced by polymerizing in the presence of a tertiary alkyl peroxidic compound a mixture of a vinyl benzene and a conjugated diene in a volatile organic solvent which is inert with respect to the monomers and non-polymerizing under the reaction conditions employed. The vinyl benzene may comprise styrene, vinylpyridines, vinylquinolines, divinylbenzene, a-methyl styrene, vinyl benzenes having one or more substituent groups on the ring, and mixtures of two or more of the aforementioned compounds. The conjugated diene may comprise isoprene, butadiene 1,3, piperylene, dimethyl butadiene, myrcene, cyclohexadiene, cyclopentadiene, dicyclopentadiene, and mixtures of two or more of these compounds. In general, the purity of the monomer has little effect on the yield or nature of the resin providing the impurities are inert under the conditions of the polymerization. In actual practice, however, it is preferable to eliminate all impurities which cannot be removed easily from the final polymer by steaming or vacuum distillation.

The polymerization is carried out in the presence of from 0.1% to 20% of a tertiary alkyl peroxidic compound which may include such peroxidic compositions as tertiary alkyl hydroperoxides: tert.-butyl hydroperoxide, tert.-amyl hydroperoxide, triethylmethyl hydroperoxide, pentamethylethyl hydroperoxide, neopentyldimethyl-methyl hydroperoxide, dimethylphenylmethyl hydroperoxide, dimethyl-p-tolylmethyl hydroperoxide, 1-methylcyclohexyl-1 hydroperoxide, 1 - methylcyclopentyl - 1 hydroperoxide, dimethyl - 4 - methylcyclohexylmethyl hydroperoxide; the di-tertiary alkyl peroxides derived from above hydroperoxides both symmetrical and unsymmetrical especially di-tert.-butyl peroxide, di-tert.-amyl peroxide, tert.-butyl tert.-amyl peroxide, tert.-butyl pentamethylethyl peroxide, tert.-butyl neopentyldimethylmethyl peroxide and tert.-butyl dimethylphenylmethyl peroxide; and peresters derived from above hydroperoxides including tert.-butyl peracetate, tert.-butyl perbenzoate, tert.-butyl diperphthalate, di-tert.-butyl peradipate and tert.-butyl perlaurate to mention a few. If desired, mixtures of the above peroxides may be used, the use of a mixture of di-t-butyl peroxide and t-butyl hydroperoxide being especially advantageous.

The choice of solvent has an extremely important effect on the physical properties of the resin, particularly the molecular weight. As a general rule, the aliphatic and alicyclic and non-benzenoid solvents and their derivatives tend to produce low molecular weight polymers, the chlorinated aliphatics such as carbon tetrachloride producing the lowest molecular weight resins; on the other hand the aromatic or benzenoid solvents tend to produce high molecular weight polymers. Solvents representative of the above classes include benzene, toluene, xylenes, ethylbenzene and cumeme, the aliphatic and alicyclic naphthas, the chloromethanes and ethanes, esters and ketones, and mixtures of above solvents.

The proportion of ingredients may be varied throughout a wide range, but as a general rule should conform to the following table:

|  | Broad Range | Preferred Proportions |
|---|---|---|
| Monomer mixture | 20–90 | 40–60 |
| Solvent | 20–75 | 40–60 |
| Peroxide catalyst | 0.1– 4+ | 1–4 |

Both the monomer and catalyst concentration have a definite effect on the size of the polymer molecule and by varying the ratio of vinyl benzene to conjugated diene the size of the polymer chain and characteristics of the resulting polymer may be varied. For example, as the ratio of diene to vinyl benzene increases the melting point or softening range decreases and the molecular weight increases. As a general rule at least one vinyl benzene and one conjugated diene must be present and the vinyl benzene should constitute the major portion of the monomer mixture, the preferred ratio range being between approximately two and six parts vinyl benzene to approximately one part conjugated diene.

The polymerization may be carried out at temperatures ranging from 70 to 150° C., but I prefer to operate within the range 100-130° C. The temperature not only affects the rate of polymerization, but also determines to a certain extent the size of the polymer chain. In general, higher temperatures favor more rapid polymerizations and shorter polymer chains. Depending on chemical makeup of the polymerizing mixture and the conditions of polymerization, the reaction time may vary from 5 to 100 hours. For reasons of economy the reaction is generally carried out in less than 50 hours. An outstanding feature of the invention is the fact that the process described herein gives extremely high yields without causing cross linking of the resin chains. In some cases the conversion is practically 100% complete and in most cases the yields are so high that there is no need to recycle monomers.

The reactions are carried out in closed systems at pressures ranging from atmospheric up to 200 pounds per square inch depending on the mixture and temperature used. The reaction vessel may be constructed of glass or steel and may be heated by any of the usual methods. For quantities over five gallons, we prefer to use a steam jacketed vessel that is equipped with an agitator to keep the temperature uniform throughout the polymerization mass. After polymerization has been completed, the resin solution may be used directly or the solvent be removed by any of the usual methods and the dry resin obtained. I prefer to remove the solvent by a combination of straight distillation, steam distillation and vacuum distillation. By use of the last two it is possible to remove last traces of impurities at temperatures below 200° C., and at the same time prevent any darkening of the hot resin through contact with air. The pure resin is flowed from the reactor while hot or it may be dissolved directly in a suitable solvent. By the use of the above process, clear, nearly colorless resins stable against the action of light, heat and air, and having exceptionally high purity can be prepared. By variations in conditions of the polymerization and constituents used therein, it is possible to obtain resins with molecular weights ranging from 1000 to about 13,000 as determined from viscosity measurements in dilute benzene solutions according to the formula of Kemp and Peters, Ind. Eng. Chem. 33, 1263 (1941). Because of the orderliness of the polymer chain and lack of cross linking the resins are highly soluble and solutions prepared therefrom have low viscosities.

Solutions of the resins give coatings that have excellent adhesion, gloss and stability. Such films may be pigmented or the resin may be mixed with soluble organic dyes to provide transparent colored films. By use of proper plasticizers such as di-cyclohexyl phthalate, a clear film of increased flexibility may be coated on paper. Other applications, suggested by the nature of these resins are in the rubber, textile and adhesive fields.

Specific examples illustrating the foregoing principles are as follows:

Example 1

The charge consisting of 336 lbs. styrene, 112 lbs. isoprene and 27 lbs. peroxide consisting of 60% tert.-butyl hydroperoxide and 40% di tert.-butyl peroxide was dissolved in 563 lbs. naphtha (Amsco Textile Spirits) and 32 lbs. benzene. The polymerization was brought about by heating the above solution to 125° C. in a jacketed stainless steel vessel of 275 gallon capacity. The contents were continuously agitated by paddle stirrer and pressure ranged from 70 to 40 pounds per square inch as the more volatile monomer was consumed. At the end of 20 hours the polymerization was 100% complete. The final solution which contained 42% solids was thin and colorless. The volatile materials were completely removed from the isoprene-styrene copolymer by means of steam and vacuum distillation and the finished hot resin was drained from the reactor and allowed to cool. The yield was 440 lbs. (98%) of hard, colorless, clear resin which had the following properties:

Melting point: 95° C. (mercury method). (Melting points measured in capillary tubes unless otherwise stated.)

Molecular weight: Approx. 2300 (intrinsic viscosity—0.10).

Acid number: Less than 0.05. Iodine number: 100.

Color: Water—white

Viscosity of 60% solution in toluol: 0 (Gardner scale)

Solubility:
  Soluble at all concentrations—
    Aromatic hydrocarbons
    Chlorinated hydrocarbons
    Esters
    Methyl ethyl ketone
    Turpentine
    Pine oil
  At resin concentration above 25%—
    Soluble in:
      VM & P naphtha
      Mineral spirits
    Insoluble in:
      Acetone
      Ethyl alcohol (95%)
      Butanol
  At concentrations of 50% the resin is soluble in the following mixed solvents:
    Toluene 20%–acetone 80%
    Toluene 60%–butanol 40%

Film resistance:
  Water—good
  Alkali—excellent
  Mineral acids—excellent
  Salt solution—excellent
  5% acetic acid—fair
  95% ethanol—poor
  Above measurements were made on a film of unplasticized resin on glass.

Compatibility: The resin shows good compatibility with rubber, plasticizers, metallic driers, and some drying oils.

Example 2

A mixture of 315 lbs. styrene, 105 lbs. isoprene, 510 lbs. naphtha, 70 lbs. carbon tetrachloride and 20 lbs. tert.-butyl perbenzoate was charged into the vessel described in Example 1. The mixture was heated for 46 hours at 100° C. and the solvents removed. An 87% yield of clear resin melting at 55° C. was obtained.

Example 3

A mixture of 3780 g. styrene, 1260 g. isoprene, and 6300 g. naphtha, 360 g. benzene and 300 g. di-tert.-butyl peroxide was slowly stirred in a 5 gallon jacketed stainless steel reactor for 20 hours at 120° C. The final resin solution contained 42% solids corresponding to a 100% conversion of monomers. Removal of solvents by distillation yielded a clear, colorless resin melting at 74° C. and having a molecular weight of 3200 (intrinsic viscosity—0.15).

Example 4

The formula and procedure given in Example 3 were followed except that 300 g. cumene hydroperoxide was used as the catalyst. Clear colorless resin melting at 65° C. and having a molecular weight of 2000 (intrinsic viscosity 0.64) was obtained in 95% yield.

Example 5

A mixture of 3780 g. styrene, 1260 g. isoprene, 6660 g. benzene and 300 g. 60% t-butyl hydroperoxide (same as Example 1) was heated at 122° C. for 20 hours in a 5 gallon steel reactor. Maximum pressure of 34 pounds at start gradually decreased to 28 pounds at finish. A 97.5% yield of clear, colorless resin was obtained, which had a molecular weight of 4000 (intrinsic viscosity—0.15) and melted at 78° C.

Example 6

A solution of 66 g. styrene, 22 g. isoprene, and 2.7 g. tert.-butyl perbenzoate in 90 g. toluene was placed in a 200 cc. laboratory bomb. The sealed bomb was placed in a bath, automatically controlled at 100° C. and the polymerization was allowed to proceed for 48 hours. Resin with an intrinsic viscosity of 0.50, equivalent to a molecular weight of 12,900, was obtained in 100% yield.

Except for melting point and molecular weight, the characteristics of the resins of Examples 2 to 6 are comparable to those of Example 1.

In order to determine effect of various isoprene-styrene ratios a series of polymerizations were run using the following general formula:

| | Parts |
|---|---|
| Monomers | 76 |
| Naphtha | 100 |
| Tert.-butyl perbenzoate | 4 |

The polymerizations were carried out in the 200 cc. capacity bombs which were heated at 100° C. for 48 hours at which time all yields were in excess of 90%. The various ratios of styrene and isoprene and properties of resin are as follows:

| Example | Parts Styrene | Parts Isoprene | Intrinsic Viscosity | Molecular Weight | Melting Point, °C. |
|---|---|---|---|---|---|
| 7 | 65 | 11 | .13 | 3,000 | 88 |
| 8 | 62 | 14 | .16 | 3,600 | 86 |
| 9 | 59 | 16 | .16 | 3,700 | 82 |
| 10 | 57 | 19 | .18 | 4,000 | 79 |
| 11 | 54 | 22 | .20 | 4,500 | 69 |
| 12 | 52 | 24 | .24 | 5,400 | 67 |
| 13 | 49 | 27 | .26 | 6,000 | 65 |

Example 14

A mixture of 31.5% styrene, 10.5% isoprene, 56% naphtha and 2% pentamethylethyl tert.-butyl peroxide was heated for 24 hours at 120° C. in the laboratory bomb and gave a 99% yield of copolymer resin which had an intrinsic viscosity of 0.19, equivalent to a molecular weight of 4200.

Example 15

A mixture of 8.7% butadiene, 33.3% styrene, 52.5% naphtha, 3% benzene, 2.5% 60% tert.-butyl hydroperoxide gave 98% yield of resin upon heating at 112° C. for 24 hours. The clear resin melted at 72° C. and had an intrinsic viscosity of 0.12, equivalent to a molecular weight of 2900.

It should be understood that the present disclosure is for the purpose of illustration only and that various changes and modifications may be made without departing from the spirit and scope of the invention as set forth in the appended claims.

I claim:

1. The process of producing a hydrocarbon resin having the herein-described properties, comprising polymerizing a mixture of a major portion of a vinyl benzene and a minor portion of a conjugated diene dissolved in a volatile organic solvent which is non-reactive with the monomers and non-polymerizing, in the presence of from 0.1 to 20% of a tertiary alkyl peroxidic composition at a temperature between 70° C. and 150° C. and for a period between 5 and 100 hours.

2. The process of producing a hydrocarbon resin having the herein-described properties, comprising polymerizing a mixture of 2 to 6 parts styrene to approximately one part isoprene dissolved in a solvent mixture of a major portion of an aliphatic naphtha and a minor portion of benzene, in the presence of from 0.1 to 20% of a tertiary alkyl peroxidic composition at a temperature between 70° C. and 150° C. and for a period between 5 and 100 hours.

3. The process of producing a hydrocarbon resin having the herein described properties, comprising polymerizing a mixture of a major portion of styrene and a minor portion of isoprene dissolved in a volatile organic solvent which is non-reactive with the monomers and non-polymerizing, in the presence of from 0.1 to 20% of a tertiary alkyl peroxidic composition at a temperature between 70° C. and 150° C. and for a period between 5 and 100 hours.

4. A substantially colorless, clear, stable hydrocarbon resin soluble in straight chain aliphatic naphthas and produced by the process of claim 3.

5. The process of producing a hydrocarbon resin having the herein described properties, comprising polymerizing a mixture of a major portion of styrene and a minor portion of butadiene-1,3 dissolved in a volatile organic solvent which is non-reactive with the monomers and non-polymerizing, in the presence of from 0.1 to 20% of a tertiary alkyl peroxidic composition at a temperature between 70° C. and 150° C. and for a period between 5 and 100 hours.

6. A substantially colorless, clear, stable hydrocarbon resin soluble in straight chain aliphatic naphthas and produced by the process of claim 5.

LLOYD H. PERRY.

REFERENCES CITED

The following references are of record in the file of this patent:

UNITED STATES PATENTS

| Number | Name | Date |
|---|---|---|
| 2,335,124 | Konrad | Nov. 23, 1943 |

FOREIGN PATENTS

| Number | Country | Date |
|---|---|---|
| 345,939 | Great Britain | Mar. 16, 1931 |
| 456,442 | Great Britain | Aug. 18, 1935 |
| 611,157 | Great Britain | Oct. 26, 1948 |